Sept. 7, 1943.　　　D. DAVIDSON ET AL　　　2,328,787
APPARATUS FOR DETERMINING SPECIFIC GRAVITY
Filed March 23, 1940
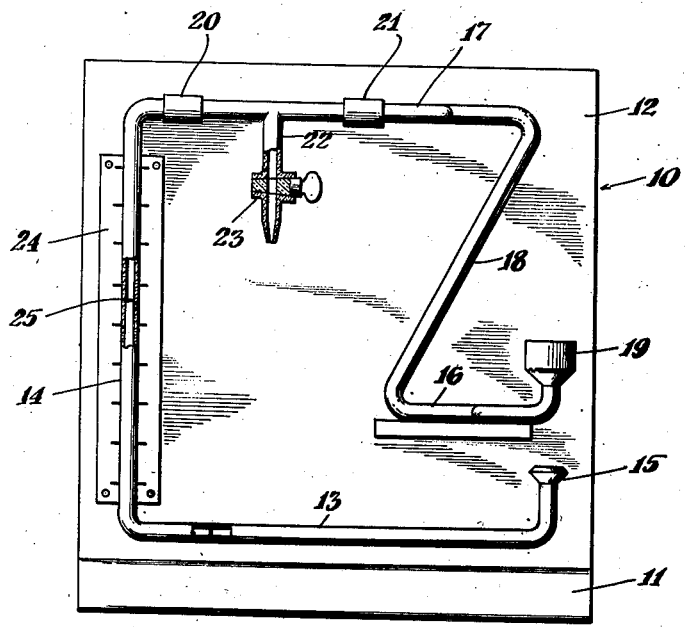
INVENTORS
DAVID DAVIDSON
MILTON POPOWSKY
BY PHILIP ROSENBLATT
Robert Calvert
ATTORNEY Patented Sept. 7, 1943

2,328,787

UNITED STATES PATENT OFFICE 2,328,787

APPARATUS FOR DETERMINING SPECIFIC GRAVITY

David Davidson, New York, and Milton Popowsky and Philip Rosenblatt, Brooklyn, N. Y.

Application March 23, 1940, Serial No. 325,506

2 Claims. (Cl. 265—44)

This invention relates to an apparatus for determining the specific gravity of a liquid.

For this purpose there have been used heretofore many different kinds of apparatus and methods.

In one method considered only approximate in the results obtained, there have been used two partly filled U-tubes containing two liquids. The tubes stand substantially vertically and have a side of each tube connected to the other and to means for applying suction or pressure. The other side of each tube is open to the atmosphere. When the suction or pressure is applied, the liquids in the connected sides are raised or depressed to an extent varying inversely with the specific gravities. The difference in height of column of the liquids in the two sides of the tubes may then be used to calculate the density of the one liquid in terms of the other. If one liquid is a standard liquid of known specific gravity, then the specific gravity of the other liquid may be calculated, since at equilibrium the hydrostatic pressure due to each liquid will be the same. In using this method, it is necessary to read two positions for each liquid, namely, the positions of the menisci of the liquid in each side of the U-tubes.

With our improved apparatus balanced liquid columns are used, but the need of reading two elevations for each liquid is eliminated. In fact, when the apparatus has been calibrated as will be described, the only reading to be recorded is one position on a scale graduated in terms of specific gravity.

It is, therefore, an object of the invention to provide a simplified apparatus for determining the specific gravity of a liquid by comparison with a standard liquid of known specific gravity. Another object is to provide an apparatus by means of which the relative heights of balancing columns of two liquids may be compared with a satisfactory degree of accuracy. These and such other objects as will appear from the description are secured by the apparatus to be disclosed.

The invention comprises the combination, construction, arrangement, and relative location of the parts of the apparatus described herein. The invention more particularly comprises apparatus for determining the specific gravity by elevating a column of a liquid above a portion thereof that is unchanging in its level and comparing the heights of this column and a balancing column of a liquid of known specific gravity.

The invention will be illustrated by description in connection with the attached drawing to which reference is made.

The figure is a front elevation of the preferred embodiment of the apparatus and is in part diagrammatic.

There is shown a rigid support 10 for the apparatus that may be of any suitable form or material of construction, as, for example, wood, metal, or molded plastic with base 11 and an upright member 12 firmly secured thereto, as by screws or other means not shown.

The measuring apparatus proper includes the bent glass tube having a side 13 that extends horizontally and a side 14 continuous with the horizontal side. The side 14 extends upwardly at a predetermined angle from the horizontal, as, for example, substantially vertically. This bent tube is of capillary bore, say 0.5 to 2 mm. or somewhat larger, and at one end is provided to advantage with a funnel-like filling member 15 which is open to the atmosphere. Such tube is adapted, whether lying horizontally or extending vertically, to retain liquid as a continuous column filling the cross section of the tube. The surface tension of the liquid causes the liquid to extend completely across the tube and overcomes the force of gravity tending to cause the liquid to rest in the lower part only of the bore of the tube.

The tube for the standard liquid contains horizontally extending sides or limbs 16 and 17 disposed one above the other at substantially different elevations, with a connecting member 18. These parts may constitute conveniently a Z-type tube. The standard liquid is supplied through end 19.

The tubes are joined, as by short lengths 20 and 21 of rubber tubing, to a T-tube 22 provided with stop-cock 23, which in turn is connected to any suitable source (not shown) of suction. The suction is suitably created by means of a conventional tube attached below the stop-cock and connecting at the other end with the bottom outlet of a container partly filled with a liquid, after the manner of the leveling devices used in connection with gas burets in the analysis of gases.

When the suction has been created to such extent that the column of standard liquid at its two ends terminates in sides 16 and 17, the stop-cock is then closed.

A scale 24 is supported directly behind the upwardly extending side 14 of the tube for the unknown liquid.

To calibrate this apparatus points on the scale may be established by the use of two liquids of known specific gravity, marks being placed at the position of the meniscus 25 when the suction is made such as to cause menisci of the standard liquid to stand in the horizontal limbs 16 and 17. The mark is then given the numerical value of the specific gravity of the calibrating liquid. With two marks so applied and numbered, the scale is then graduated. It will be a reciprocal scale, that is, the numbers on the scale become smaller as the elevation increases.

In using the unknown liquid it is subjected to suction sufficient to establish the menisci of the standard liquid in parts 17 and 16. The position of the meniscus of the unknown liquid on scale 24 is then read as the specific gravity of the said liquid.

Alternately, the standard liquid may be contained in parts 13 and 14 and the liquid of unknown specific gravity in the Z-tube of parts 16, 17 and 18. In this case, the scale is linear and is established in usual manner, by means of two liquids of known specific gravities, as described above.

It will be understood that the terms "bent tube" and "tubular member" are used herein to include not only integral tubes of glass or the like, but also assemblies in which separate pieces of tubing are joined, as by rubber tubing.

It will be understood also that the details given are for the purpose of illustration, not restriction, and that variations within the spirit of the invention are intended to be included in the scope of the appended claims.

What we claim is:

1. An apparatus for measuring the density of a liquid of unknown specific gravity which comprises a tube for containing the unknown liquid, said tube having a horizontal and a vertical portion; a tubular member for receiving a standard liquid, comprising two horizontal end portions disposed at substantially different elevations and a tubular connection therebetween; a second tubular member extending between the top of the said vertical tube and the upper one of the said end portions; means in communication with said second member and connectable with a source of partial vacuum for causing a portion of the unknown liquid to rise in the vertical tube; and means for reading the height of the column thus established when balanced against a column of the standard liquid terminating at its two ends in the said end portions of the tubular member.

2. An apparatus for measuring the density of a liquid of unknown specific gravity by balancing a column of it against a column of a standard liquid of known specific gravity, the apparatus comprising a tube for containing one of the liquids, said tube having a horizontal and a vertical portion; a tubular member for receiving the other of the liquids comprising two horizontal end portions disposed at substantially different elevations and a tubular connection therebetween; a second tubular member extending between the top of the said vertical portion of the tube and the upper one of the said end portions; means in communication with said second member and connectable with a source of partial vacuum for causing a portion of the said one of the liquids to rise in the vertical tube; and means for reading the height of the column thus established when balanced against a column of the said other of the liquids terminating at its two ends in the said end portions of the tubular member.

DAVID DAVIDSON.
MILTON POPOWSKY.
PHILIP ROSENBLATT.